(12) United States Patent
Zürcher et al.

(10) Patent No.: US 11,135,988 B2
(45) Date of Patent: Oct. 5, 2021

(54) PASSENGER RESTRAINT SYSTEM FOR ROLLER COASTERS

(71) Applicant: Bolliger & Mabillard Ingénieurs Conseils S.A., Monthey (CH)

(72) Inventors: Alain Zürcher, Pampigny (CH); Éric Berra, Monthey (CH)

(73) Assignee: Bolliger & Mabillard Ingenieurs Conseils S.A., Monthey (CH)

( * ) Notice: Subject to any disclaimer, the term of this patent is extended or adjusted under 35 U.S.C. 154(b) by 0 days.

(21) Appl. No.: 16/825,956

(22) Filed: Mar. 20, 2020

(65) Prior Publication Data
US 2020/0298783 A1   Sep. 24, 2020

(30) Foreign Application Priority Data

Mar. 22, 2019  (EP) ..................... 19164728

(51) Int. Cl.
  *B60R 21/02*  (2006.01)
  *B60R 21/00*  (2006.01)

(52) U.S. Cl.
  CPC ...... *B60R 21/02* (2013.01); *B60R 2021/0037* (2013.01); *B60R 2021/0097* (2013.01); *B60R 2021/022* (2013.01)

(58) Field of Classification Search
  CPC .... B60R 2021/0037; B60R 2021/0097; A62B 35/00; A62B 35/005; A63G 1/30; A63G 1/34; A63G 1/00; A61G 5/10
  See application file for complete search history.

(56) References Cited

U.S. PATENT DOCUMENTS

| 4,054,319 A | * | 10/1977 | Fogg, Jr. | ................ A61G 5/042 297/466 |
| 4,531,459 A | | 7/1985 | Yamada | |
| 5,772,226 A | * | 6/1998 | Bobichon | ................ A61G 5/14 180/907 |

(Continued)

FOREIGN PATENT DOCUMENTS

| CH | 664502 A5 | 3/1988 |
| JP | S592782 A | 1/1984 |

(Continued)

OTHER PUBLICATIONS

Extended European Search Report; European Patent Office; European Patent Application No. 19164728.8; dated Oct. 10, 2019; 5 pages.

*Primary Examiner* — James A English
(74) *Attorney, Agent, or Firm* — Taft Stettinius & Hollister LLP

(57) ABSTRACT

A passenger restraint system for roller coasters, designed to maintain a passenger in an essentially upright posture, the passenger restraint system including a fixed column and a seat column designed to support and hold the passenger, which seat column is coupled to the fixed column so as to be movable relative to the fixed column and to be adjustable to the size of the passenger during an embarkation phase. The seat column is coupled to the fixed column by an articulated linkage, and the passenger restraint system further includes a device for balancing the seat column, which balancing device includes a cylinder fixed, at a first articulated end, to the fixed column and, at a second articulated end, to the seat column.

31 Claims, 7 Drawing Sheets

(56) References Cited

U.S. PATENT DOCUMENTS

| | | | | |
|---|---|---|---|---|
| 7,815,209 B2* | 10/2010 | Porcheron | ............ | A61G 5/1089 |
| | | | | 280/304.1 |
| 7,987,793 B2* | 8/2011 | Blonk | ............ | A63G 7/00 |
| | | | | 104/53 |
| 2002/0070599 A1* | 6/2002 | Berra | ............ | A63G 7/00 |
| | | | | 297/466 |

FOREIGN PATENT DOCUMENTS

| | | | |
|---|---|---|---|
| WO | 2007136245 | A1 | 11/2007 |
| WO | 2010055531 | A1 | 5/2010 |

\* cited by examiner

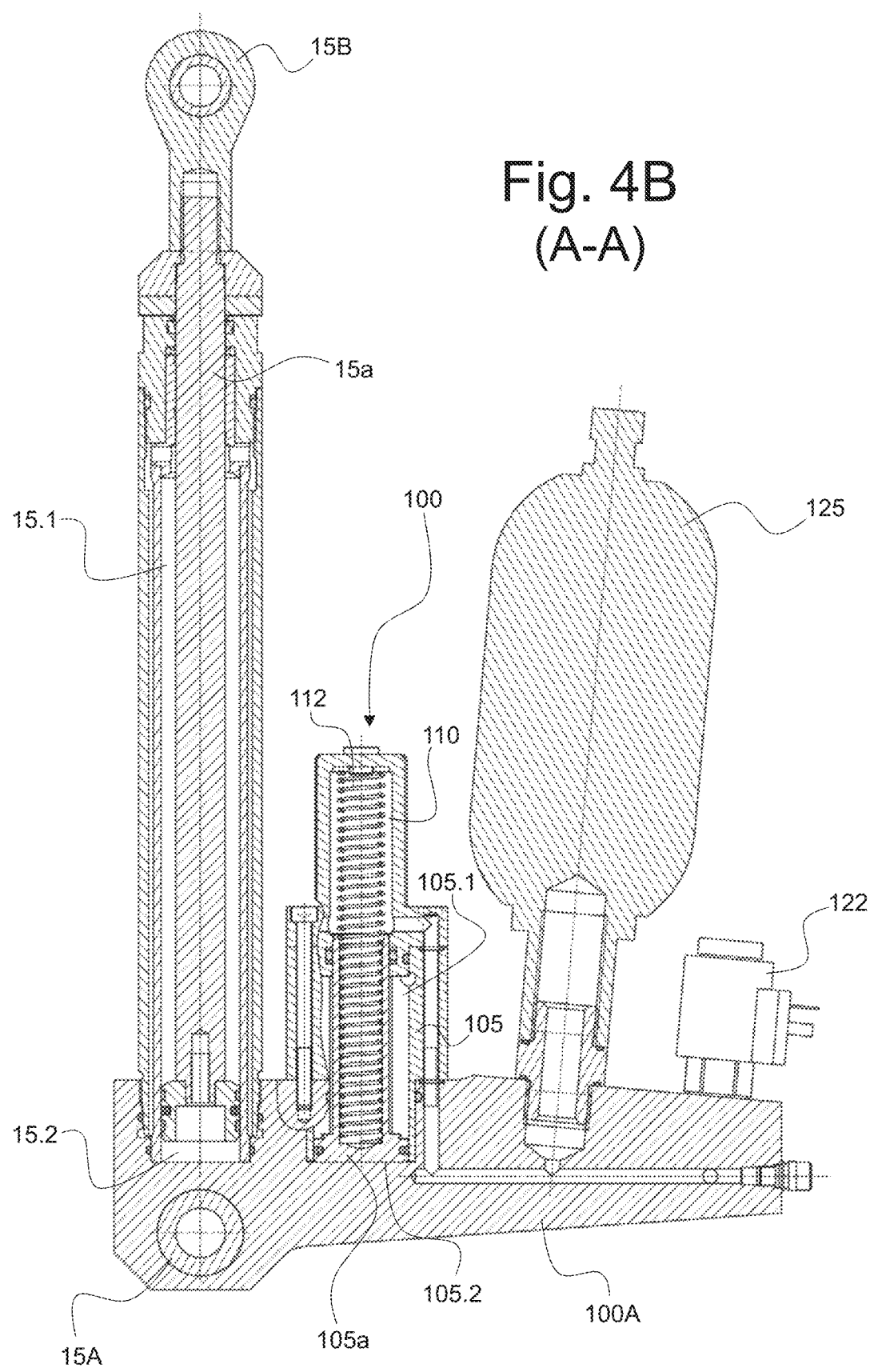

PASSENGER RESTRAINT SYSTEM FOR ROLLER COASTERS

CROSS REFERENCE TO RELATED APPLICATIONS

This application claims priority to European Application No. 19164728.8 filed Mar. 22, 2019, the contents of which is hereby incorporated by reference in their entirety.

TECHNICAL FIELD

The present invention generally relates to a passenger restraint system for roller coasters, and more specifically to such a passenger restraint system designed to maintain a passenger in an essentially upright posture (standing) during a roller coaster ride.

BACKGROUND ART

Such passenger restraint systems are known from the prior art, and in particular are used in various upright posture roller coaster installations (or "stand-up roller coasters") such as "The Riddler's Revenge" at the "Six Flags Magic Mountain" park in Valencia near Santa Clarita, Calif., an installation designed by the present Applicant.

U.S. Pat. No. 4,531,459 A discloses several variants of passenger restraint systems for maintaining passengers in an essentially upright posture for roller coasters. According to a first embodiment variant illustrated in FIGS. 1 to 9 of this U.S. Pat. No. 4,531,459 A, the restraint system comprises a holding device comprising a height-adjustable support frame, which is movable vertically via sliders along a fixed column, which is secured at its base to the chassis of the vehicle intended to travel on the roller coaster. The support frame is height-adjustable to the size of the passenger and is lockable in the desired position by means of a hydraulic locking cylinder. Balancing of the holding device is ensured by a gas spring. The support frame bears an arched backrest intended to support the back and hips of the passenger, a headrest, a saddle, a pair of laterally pivotable harnesses, and a pivotable abdominal holding element configured to press against the passenger's abdomen. The hydraulic locking cylinder comprises upper and lower hydraulic chambers coupled to an accumulator via a hydraulic circuit comprising an electrovalve disposed between the accumulator and the upper hydraulic chamber of the hydraulic locking cylinder. Furthermore, a reservoir tank is connected to the upper hydraulic chamber of the hydraulic locking cylinder. When the electrovalve is activated, the hydraulic fluid can circulate between the upper and lower hydraulic chambers of the hydraulic locking cylinder, thus allowing vertical displacement of the support frame, and therefore adjustment of the holding device to the size of the passenger. Once its position has been adjusted to the size of the passenger, the support frame is locked at a locking point by closing the electrovalve, preventing any transit of hydraulic fluid between the upper and lower hydraulic chambers of the hydraulic locking cylinder. In this locked position, the holding device therefore cannot move relative to the locking point. However, in the event of an overload, for example during application of an excessive force of gravity due to strong vertical acceleration, the piston of the hydraulic locking cylinder, which normally remains immobile under normal conditions, may lower, causing a transfer of hydraulic fluid from the lower hydraulic chamber of the hydraulic locking cylinder to the accumulator. At the same time, hydraulic fluid is furnished by the reservoir tank to the upper hydraulic chamber of the hydraulic locking cylinder. When the overload is interrupted, the piston of the hydraulic locking cylinder is returned to its earlier position by the action of the accumulator, which forces the hydraulic fluid to return to the lower hydraulic chamber of the hydraulic locking cylinder. This arrangement therefore allows damping in the event of an overload, but does not allow any displacement of the hydraulic locking cylinder, and therefore of the holding device, under normal conditions, except during the embarkation phase when the electrovalve is activated to release the hydraulic locking cylinder and allow adjustment to the size of the passenger. This solution therefore offers only limited comfort during the roller coaster ride.

Swiss patent No. CH 664 502 A5 discloses a passenger restraint system for maintaining passengers in an essentially upright posture, comprising a holding device consisting of a sled balanced by a gas spring, which sled is designed to slide vertically, by means of four bearings, along two columns that are fixed by their base to the chassis of the vehicle intended to travel on the roller coaster. The sled is lockable, preferably mechanically, at any height of the columns depending on the size of the passenger. Attached to the sled is a bucket-shaped padded saddle for supporting the passenger. Moreover, the sled has a backrest integrating a headrest, a lateral restraint, and a pair of harnesses mounted on either side of the backrest, including a fixed harness and a mobile harness, mounted pivotably, equipped with a ventral bar. In order to allow adjustment of the height of the restraint system to the size of the passenger, the sled is positioned such that the saddle is in the highest possible position between the legs of the passenger in question, with the back pressed against the backrest and one shoulder and one arm engaged in the fixed harness. In this vertical position, the sled is locked onto the columns by a locking device, and the movable harness is lowered until the ventral bar is positioned against the abdomen of the passenger, following which it is finally locked. This solution, although robust, offers only limited comfort during the roller coaster ride, just like the solutions described in the aforementioned U.S. Pat. No. 4,531,459 A.

International (PCT) application No. WO 2007/136245 A1 discloses a passenger restraint system comprising a holding device configured to engage with the upper half of the passenger's body and to hold the passenger, the holding device being connected by connection means to a support structure. The connection means are designed to enable the passenger to perform movements during the roller coaster ride while being held by the holding device. This restraint system in particular aims at allowing the passenger to perform movements between a standing position and a squatting position, and also a forward rotational movement of the passenger's torso, and possibly a lateral movement of the passenger's torso. It will therefore be understood that the holding device is not locked in any specific position, but on the contrary free to move in several directions depending on the impulsion given by the passenger. This restraint system has the disadvantage of requiring a very complex articulated structure to support the holding device and allow the passenger to perform the various movements mentioned above, which results in increased manufacturing and maintenance costs, thus making this solution not very practicable. Moreover, the freedom of movement given to the passenger does not in fact maintain the passenger adequately during the roller coaster ride, resulting in too great a feeling of insecurity, which is not desirable.

There is therefore a need to provide a passenger restraint system for maintaining a passenger in an essentially upright posture that remedies the problems and limitations of the known solutions.

SUMMARY OF THE INVENTION

Therefore, a general aim of the invention is to provide a passenger restraint system for maintaining a passenger in an essentially upright posture that remedies the disadvantages and limitations of the known solutions.

More particularly, an aim of the present invention is to provide such a solution that guarantees both suitable holding of the passenger while ensuring better comfort for the passenger during roller coaster rides.

Moreover, an aim of the present invention is to provide such a solution that is robust and reasonably simple to implement.

Another aim of the present invention is to provide such a solution that is reliable and for which maintenance is facilitated.

With regard to the aforementioned aims, there is provided, in accordance with a first aspect of the present invention, a passenger restraint system for roller coasters, the features of which are listed in claim 1, namely such a passenger restraint system designed to maintain a passenger in an essentially upright posture, the passenger restraint system comprising a fixed column and a seat column designed to support and hold the passenger, which seat column is coupled to the fixed column so as to be movable relative to the fixed column and to be adjustable to the size of the passenger during an embarkation phase. According to this first aspect of the invention, the seat column is coupled to the fixed column by means of an articulated linkage, and the passenger restraint system further comprises a device for balancing the seat column, which balancing device comprises a cylinder fixed, at a first articulated end, to the fixed column and, at a second articulated end, to the seat column.

According to this first aspect of the invention, and contrary to known solutions, it will therefore be noted that the seat column is not mounted directly on the fixed column in such a way as to slide in a substantially vertical direction, which requires guidance by means of sliders or other bearings mounted slidably along one or more columns used for guidance, but by means of an articulated linkage, which offers an easier movement as well as greater smoothness and softness of displacement, particularly during the height adjustment to the size of the passenger. Moreover, this articulated linkage is simpler and more compact than the known solutions.

According to a particularly preferred embodiment, the articulated linkage comprises a set of levers articulated on the fixed column and on the seat column and forming a parallelogram linkage between the fixed column and the seat column. This ensures optimal guidance of the seat column on the fixed column, also guaranteeing that the orientation of the seat column relative to a vertical direction remains unchanged, irrespective of the height adjustment of the seat column.

Preferably, the cylinder extends through an intermediate space of the articulated linkage, which results in a particularly compact arrangement.

Advantageously, the cylinder can in particular be a hydraulic cylinder that also provides, in addition to balancing the seat column, selective locking of the seat column at a locking point. This solution therefore makes it possible to not have to use an ad hoc balancing element, such as a gas spring, the hydraulic cylinder here fulfilling two functions, namely ensuring the balancing of the seat column and enabling the selective locking of the seat column depending on the size of the passenger.

In this latter context, the passenger restraint system can further comprise a hydraulic device coupled to the hydraulic cylinder and configured to provide controlled displacement of the hydraulic cylinder, and thus of the seat column, relative to the locking point.

The latter aspect furthermore constitutes another aspect of the invention that is applicable irrespective of the manner in which the seat column is coupled to the fixed column. Thus, in accordance with a second aspect of the present invention, there is further provided a passenger restraint system for roller coasters, the features of which are listed in independent claim 18, namely such a passenger restraint system designed to maintain a passenger in an essentially upright posture, the passenger restraint system comprising a fixed column and a seat column designed to support and hold the passenger, which seat column is coupled to the fixed column so as to be movable relative to the fixed column and to be adjustable to the size of the passenger during an embarkation phase. According to this second aspect of the invention, the passenger restraint system further comprises (i) a hydraulic cylinder for balancing the seat column and for selectively locking the seat column at a locking point, which hydraulic cylinder is fixed, at a first end, to the fixed column and, at a second end, to the seat column, and (ii) a hydraulic device coupled to the hydraulic cylinder and configured to provide controlled displacement of the hydraulic cylinder, and thus of the seat column, relative to the locking point.

With regard to the use of the aforementioned hydraulic cylinder for balancing the seat column, the passenger restraint system preferably further comprises an accumulator coupled to the hydraulic cylinder, which accumulator is capable of generating a hydraulic pressure necessary for balancing the weight of the seat column. This accumulator can in particular be a hydropneumatic accumulator.

In the latter context, the accumulator is preferably coupled to upper and lower hydraulic chambers of the hydraulic cylinder, the accumulator being coupled to the upper hydraulic chamber of the hydraulic cylinder via a first electrovalve and to the lower hydraulic chamber via a second electrovalve. These first and second electrovalves can be activated, during the passenger embarkation phase, in order to allow the passage of hydraulic fluid from the lower hydraulic chamber to the upper hydraulic chamber of the hydraulic cylinder, and vice versa, thus placing the hydraulic cylinder in an unlocked configuration allowing the adjustment of the seat column to the size of the passenger. Conversely, these first and second electrovalves can be deactivated in order to prevent the passage of hydraulic fluid from the lower hydraulic chamber to the upper hydraulic chamber of the hydraulic cylinder, and vice versa, thus placing the hydraulic cylinder in a locked configuration.

The aforementioned first and second electrovalves are preferably each provided with a non-return valve allowing the hydraulic fluid to circulate from the accumulator to the upper hydraulic chamber or the lower hydraulic chamber of the hydraulic cylinder when the first and second electrovalves are deactivated.

As regards the controlled displacement of the hydraulic cylinder and of the seat column, the hydraulic device preferably comprises a floating cylinder comprising a floating piston and upper and lower hydraulic chambers disposed on either side of the floating piston, which chambers are connected to the upper and lower hydraulic chambers of the hydraulic cylinder so as to allow, when the hydraulic cylinder is in the locked configuration, the passage of the hydraulic fluid from the hydraulic cylinder to the floating cylinder, and vice versa, the floating piston having an amplitude of movement and a capacity determining the amplitude of the controlled displacement of the hydraulic cylinder and of the seat column.

In the latter context, the hydraulic device can furthermore comprise a balancing chamber subjecting the floating piston to the same hydraulic pressure as that of the accumulator.

According to a preferred variant, the hydraulic device further comprises at least one biasing element exerting a return force on the floating piston, such as a compression spring, an elastomer spring or a pneumatic spring, so as to enable the floating piston to be returned to a determined starting position during the embarkation phase. In particular, the hydraulic device can comprise a single biasing element arranged so as to return the floating piston to a lower position during the embarkation phase. Alternatively, the hydraulic device can comprise two biasing elements operating in opposition and arranged in such a way as to return the floating piston to an intermediate position between upper and lower positions during the embarkation phase.

The passenger restraint system can also advantageously comprise a flow regulator placed in the path of the hydraulic fluid between the hydraulic cylinder and the floating cylinder, so as to allow adjustment of the speed of displacement of the piston of the hydraulic cylinder, and therefore of the seat column, in the locked configuration. This flow regulator can in particular be placed in a conduit connecting the lower hydraulic chamber of the hydraulic cylinder to the lower hydraulic chamber of the floating cylinder.

Finally, the passenger restraint system can also comprise means configured to damp the controlled displacement of the hydraulic cylinder, and thus limit the risks of impact when the system reaches a stop.

Also claimed is a roller coaster comprising at least one passenger restraint system according to the invention.

Other aspects of the invention are explained in the remainder of the present description.

BRIEF DESCRIPTION OF THE DRAWINGS

The features and advantages of the present invention will become more clearly apparent from the following detailed description of various embodiments of the invention, which are presented solely by way of non-limiting examples and are illustrated by the appended drawings, in which:

FIG. 4B is a cross-sectional view of the hydraulic system of FIG. 4 along sectional plane A-A shown in FIG. 4A.

EMBODIMENTS OF THE INVENTION

The present invention will be described with reference to various preferred embodiments as illustrated particularly in the appended figures.

Figure 1:
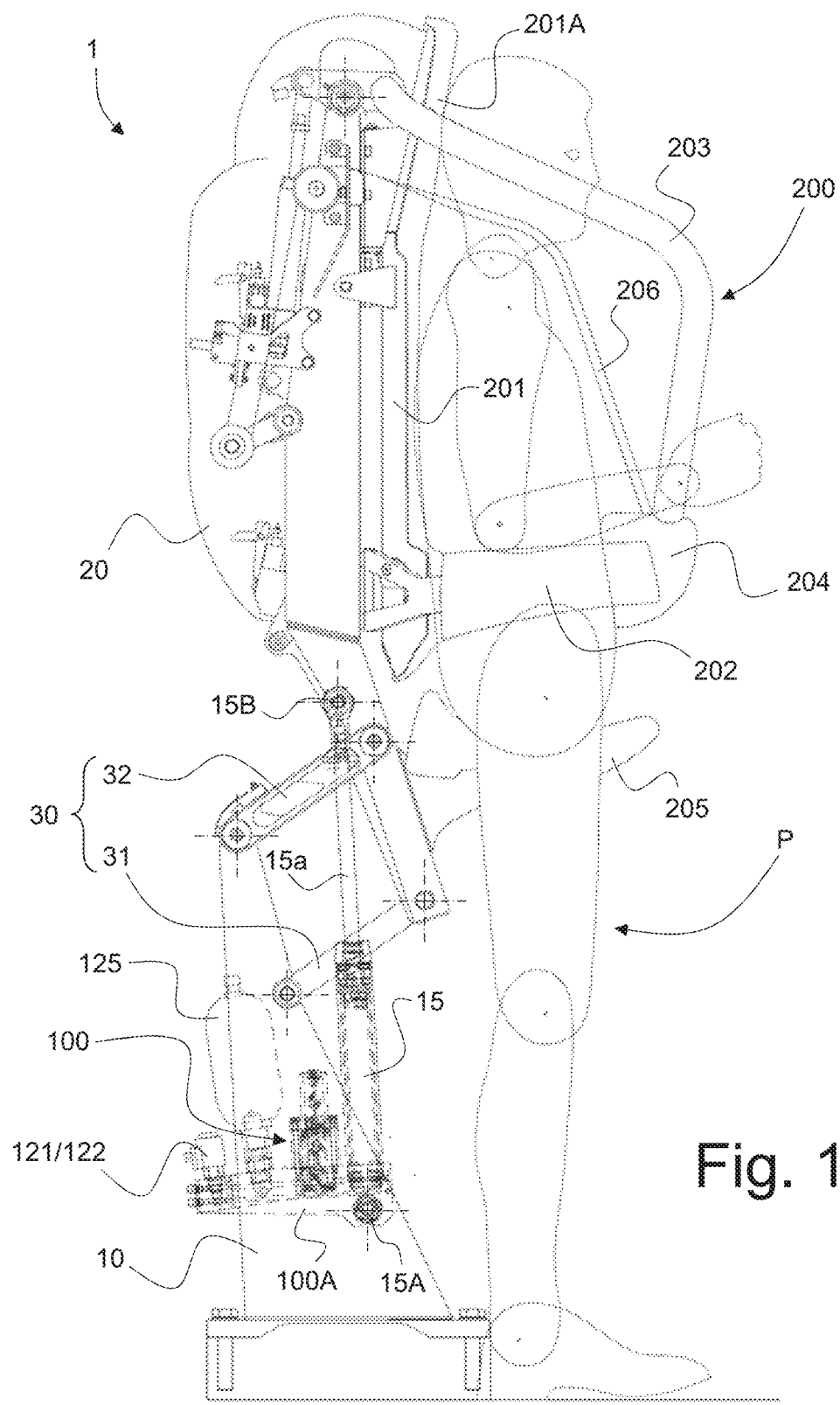
FIG. 1 is a side view of a passenger restraint system according to one embodiment of the invention.

FIG. 1 shows a side view of a passenger restraint system for roller coasters, which system is generally designated by reference numeral 1, according to one embodiment of the invention. This passenger restraint system 1 is designed to maintain a passenger, also illustrated schematically in FIG. 1 and designated by reference P, which passenger P is supported and held by the passenger restraint system 1.

The passenger restraint system 1 comprises a fixed column 10, which is conventionally fixed by its base to a platform on which the passenger P stands in an upright position. This platform typically forms part of a vehicle (not shown) designed to move on the roller coaster. The passenger P is supported and held by a seat column 20, which is coupled to the fixed column 10 so as to be movable relative to the fixed column 10 and to be adjustable to the size of the passenger P during an embarkation phase.

The seat column 20 is provided with a holding device 200 configured to cooperate with the upper half of the body of the passenger P, which holding device 200 can take various forms. According to the embodiment illustrated by way of illustrative example in FIG. 1 and in FIG. 2, the holding device 200 essentially comprises a backrest 201 fixed to the seat column 20, against which the passenger P can rest, with the back and hips placed against the backrest 201, which backrest 201 is further provided with a headrest 201A and a pair of lateral holding elements 202 configured to enclose the passenger P at the hips. The holding device 200 further comprises a front safety bar 203, mounted pivotably on an upper part of the seat column 20 and designed to be lowered over the shoulders and in front of the torso of the passenger P. This front safety bar 203 here comprises, at its distal end, an abdominal holding element 204 which presses against the abdomen of the passenger P when the front safety bar 203 is lowered. This safety bar is typically locked in position by a suitable locking device once positioned over the passenger's abdomen. The holding device 200 further comprises a saddle 205, preferably padded, mounted on the lower part of the seat column 20 and designed to be placed between the legs and beneath the buttocks of the passenger P in order to support them in the illustrated essentially upright posture. The illustrated holding device 200 also comprises an integral harness 206 mounted, at one end, on the upper part of the seat column 20 above the level of the shoulders of the passenger P, and at another end, on the abdominal holding element 204 placed on the front safety bar 203. The integral harness 206 is thus lowered onto the shoulders of the passenger P during the lowering of the front safety bar 203, thus holding the passenger P by the shoulders.

It will be understood that the invention is not specifically limited to a passenger restraint system comprising a holding device 200 as specifically illustrated, other configurations of holding devices being perfectly conceivable.

According to a first aspect of the invention, the seat column 20 is coupled to the fixed column 10 by means of an articulated linkage designated by reference numeral 30, and the passenger restraint system 1 further comprises a device for balancing of the seat column 20. This balancing device comprises in particular a cylinder 15 fixed, at a first articulated end 15A, to the fixed column 10 and, at a second articulated end 15B, to the seat column 20. In the illustrated preferred embodiment variant, reference 15a designates a piston of the cylinder 15, which is secured, at the articulated end 15B, to the seat column 20.

The articulated linkage 30 can take a variety of forms. Preferably, as illustrated, this articulated linkage 30 comprises a set of levers, respectively lower levers 31 and upper levers 32, that advantageously form a parallelogram linkage between the fixed column 10 and the seat column 20. More specifically, the articulated linkage 30 here comprises a pair of lower levers 31 articulated at each end to the fixed column 10, on the one hand, and to the seat column 20, on the other hand. Similarly, the articulated linkage 30 comprises a pair of upper levers 32, the effective length of which is identical to the effective length of the lower levers 31, which upper levers 32 are similarly articulated at each end to the fixed column 10, on the one hand, and to the seat column 20, on the other hand.

The very compact configuration of the articulated linkage 30 is immediately noticeable. The geometry of the articulated linkage 30 is preferably chosen in such a way that the seat column 20 can be moved along an essentially vertical trajectory, it being noted, however, that the parallelogram linkage causes a relative movement between the fixed column 10 and the seat column 20 along an arc-of-circle trajectory, the amplitude of movement, during the embarkation phase, being determined by the effective working amplitude of the cylinder 15. In this respect, FIG. 1 shows the restraint system 1 in a configuration where the seat column 20 is placed in an upper position, the cylinder 15 being illustrated in a position where the piston 15a is nearly fully deployed.

The ends 15A, 15B of the cylinder 15 are articulated here, in the sense that the cylinder 15 undergoes a slight movement in rotation about an axis coinciding with the lower end 15A of the cylinder 15 depending on the positioning of the seat column 20 relative to the fixed column 10, causing a corresponding relative movement of the cylinder 15 in relation to the fixed column 10 and to the seat column 20.

Advantageously, the cylinder 15 extends through an intermediate space 30A (see FIG. 2) of the articulated linkage 30, that is, through the space formed between the lower levers 31 and between the upper levers 32.

Figure 2:
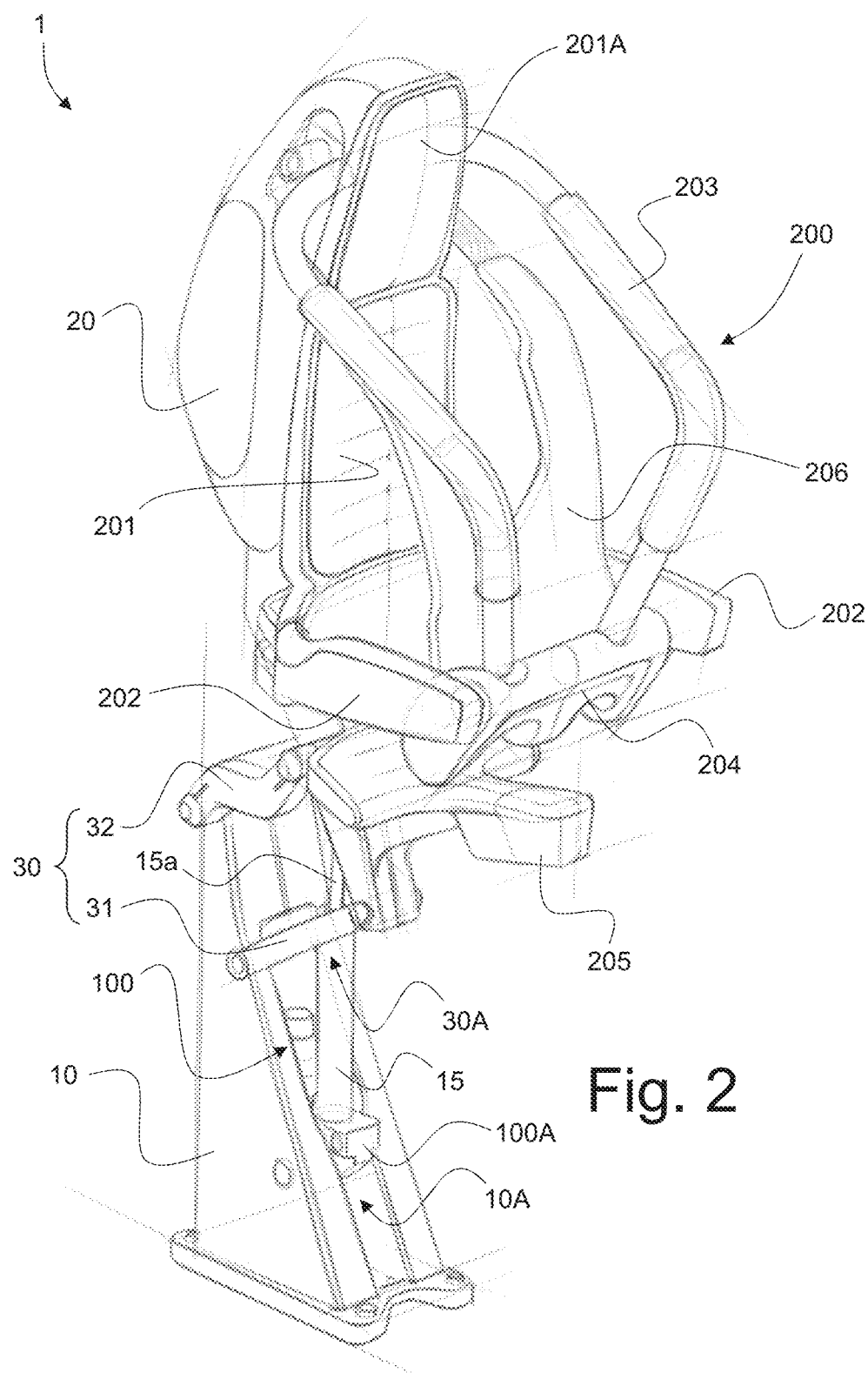
FIG. 2 is a perspective illustration of the passenger restraint system according to FIG. 1.

The use of an articulated linkage between the fixed column 10 and the seat column 20, such as the articulated linkage 30 illustrated in FIGS. 1 and 2, offers an easier movement and a softer, smoother displacement particularly during the height adjustment to the size of the passenger P. Furthermore, this articulated linkage is simpler and more compact than the prior art solutions, and facilitates maintenance due to the reduction in the number of wearing parts.

According to the illustrated embodiment, it will be noted that the cylinder 15 is preferably a hydraulic cylinder that also provides the selective locking of the seat column 20 at a locking point. In other words, the hydraulic cylinder 15 fulfils two functions here, namely balancing the seat column 20 and enabling the selective locking of the seat column 20 depending on the size of the passenger P, a solution that thus makes it possible to eliminate the use of an ad hoc balancing element such as a gas spring.

More advantageously still, according to another aspect of the invention which is applicable irrespective of the aforementioned articulated linkage, the passenger restraint system 1 further comprises a hydraulic device 100 coupled to the hydraulic cylinder 15 and configured to provide controlled displacement of the hydraulic cylinder 15, and thus of the seat column 20, relative to the locking point. This controlled displacement is intended to allow the passenger P to perform a controlled movement, the amplitude of which is limited and determined. The result of this controlled displacement is illustrated schematically in FIG. 1A where the same passenger P can be seen in two extreme positions, the restraint system 1 being in a locked configuration, reference A designating the effective amplitude of the displacement allowed by the hydraulic device 100. Because the seat column 20 is not locked in a determined locking position, unlike the known solutions, one may speak here of a "floating" locking.

Figure 1A:
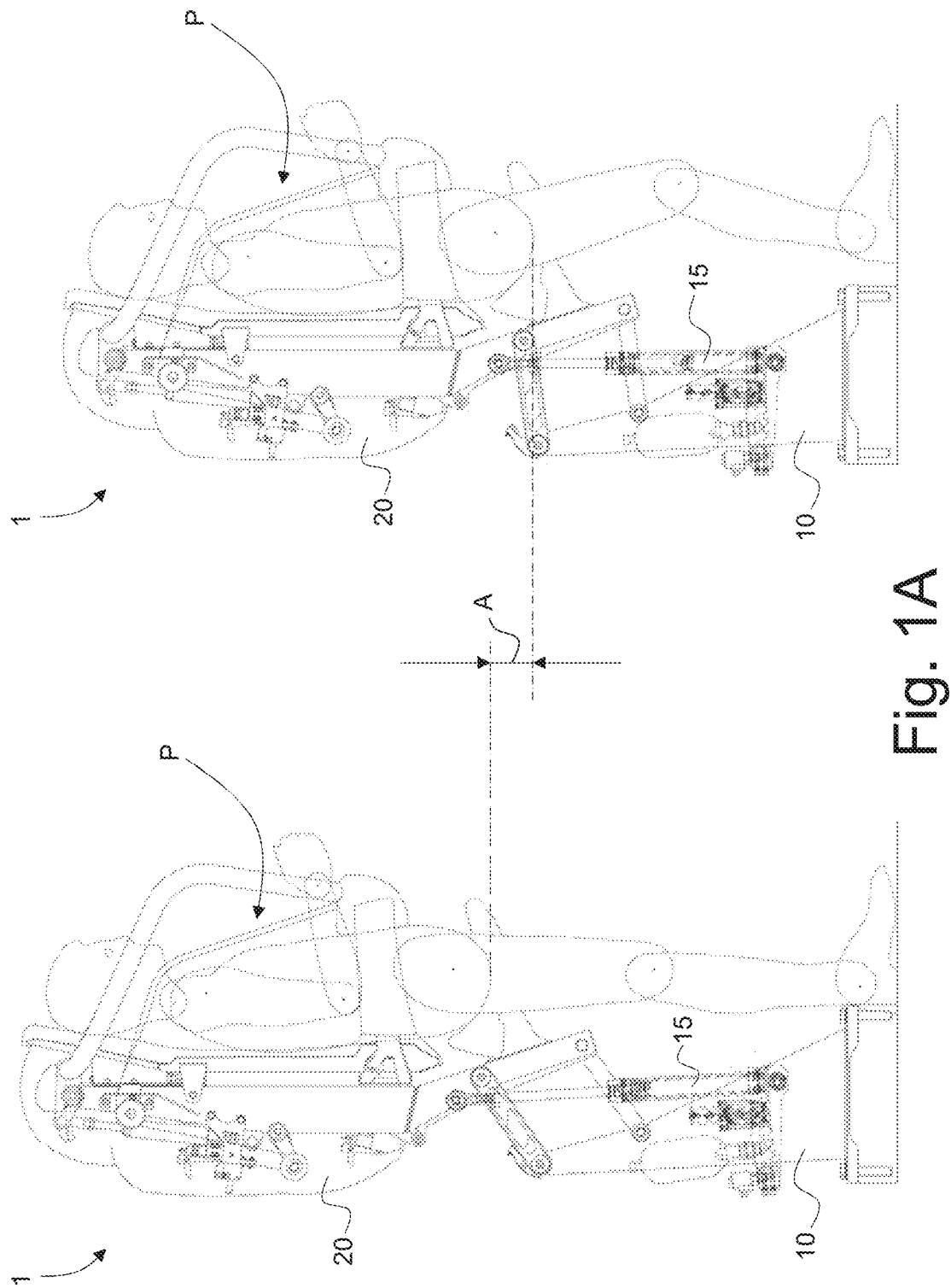
FIG. 1A is a side view of the passenger restraint system of FIG. 1, illustrating a controlled displacement of said restraint system in a locked configuration.

According to the embodiment being discussed, the "upper" locked position illustrated in the left-hand part of FIG. 1A corresponds to the position in which the passenger P positioned the seat column 20 when the seat column 20 was locked, a downward movement of the seat column 20, of a maximum amplitude A, being made possible. However, the controlled displacement can be implemented in any other way, for example in such a way that the passenger P can perform movements up and down around the locking point, still over a maximum amplitude A. This will become more clearly apparent from reading the following.

As already mentioned above, the controlled displacement of the hydraulic cylinder 15 relative to the locking point can be implemented independently of the use of an articulated linkage between the fixed column 10 and the seat column 20. As an alternative example, the controlled displacement of the hydraulic cylinder 15 could also be implemented in the context of a column restraint system like the one described in U.S. Pat. No. 4,531,459 A mentioned in the preamble, subject to making the necessary adaptations of the hydraulic device coupled to the hydraulic cylinder, as discussed below.

Figure 3:
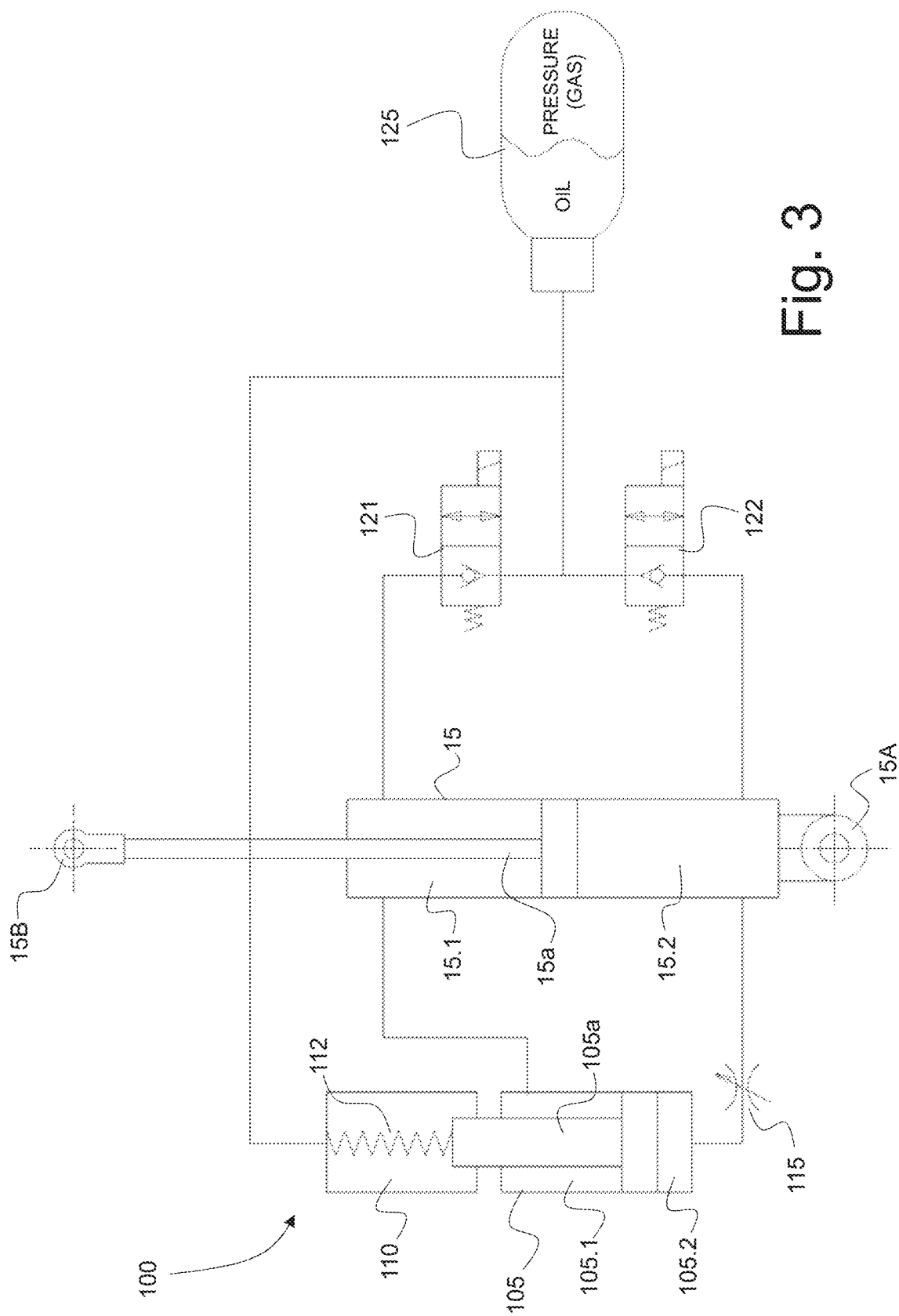
FIG. 3 is a diagram of the hydraulic system equipping the passenger restraint system of FIG. 1.

FIG. 3 is a diagram of the hydraulic system equipping the passenger restraint system 1 of FIG. 1 according to a particularly preferred embodiment variant of the invention. As can be seen in FIG. 3, the hydraulic system associated with the hydraulic cylinder 15, also shown in FIG. 3, comprises in particular an accumulator 125 (also visible in FIG. 1) coupled to the hydraulic cylinder 15, which accumulator 125 is capable of generating a hydraulic pressure necessary for balancing the weight of the seat column 20. This accumulator 125 can in particular be a hydropneumatic accumulator, particularly a bladder type hydropneumatic accumulator, which is filled with a gas (for example nitrogen) which acts as compressible fluid and enables the storage of energy. In this instance, this stored energy is used to generate the hydraulic pressure necessary for balancing the weight of the seat column 20, i.e. to compensate for the force exerted on the hydraulic cylinder 15 by the weight of the seat column 20 and thus facilitate adjustment of the height of the seat column 20 during the embarkation phase. In the known solutions, this balancing is normally achieved by means of a gas spring.

As illustrated in FIG. 3, the accumulator 125 is advantageously coupled to upper 15.1 and lower 15.2 hydraulic chambers of the hydraulic cylinder 15, the accumulator 125 being coupled to the upper hydraulic chamber 15.1 via a first electrovalve 121 and to the lower hydraulic chamber 15.2 via a second electrovalve 122. During the embarkation phase, the electrovalves 121, 122 are activated (open), allowing the hydraulic fluid to circulate from the lower hydraulic chamber 15.2 to the upper hydraulic chamber 15.1, and vice versa, enabling the passenger P to move the seat column 20, causing displacement of the piston 15a inside the hydraulic cylinder 15. Once the embarkation phase has been completed, the electrovalves 121, 122 can be re-closed (deactivated) in order to prevent any transit of hydraulic fluid between the upper 15.1 and the lower 15.2 hydraulic chambers of the hydraulic cylinder 15, thus placing the hydraulic cylinder 15 in the locked configuration. In this configuration, and in the absence of the additional hydraulic device 100 detailed more fully below, the seat column 20 would not be able to move (or "float") once locked.

Preferably, the first and second electrovalves 121, 122 each have a non-return valve allowing the hydraulic fluid to circulate from the accumulator 125 to the upper hydraulic chamber 15.1 or the lower hydraulic chamber 15.2 of the hydraulic cylinder 15 when the first and second electrovalves 121, 122 are deactivated.

To enable the "floating" locking mentioned above, i.e. a controlled displacement of the hydraulic cylinder 15 (and therefore of the seat column 20) relative to the locking point, the additional hydraulic device 100 is provided. According to a particularly preferred embodiment variant, as illustrated in FIG. 3, the hydraulic device 100 comprises a floating cylinder 105 comprising a floating piston 105a and upper 105.1 and the lower 105.2 hydraulic chambers disposed on either side of the floating piston 105a. These upper 105.1 and lower 105.2 hydraulic chambers are connected to the upper 15.1 and lower 15.2 hydraulic chambers of the hydraulic cylinder 15 so as to allow, when the hydraulic cylinder 15 is in the locked configuration (i.e. when the electrovalves 121, 122 are deactivated), the passage of the hydraulic fluid from the hydraulic cylinder 15 to the floating cylinder 105, and vice versa. It will be understood that the floating piston 105a has an amplitude of movement and a capacity that jointly determine the amplitude A of the controlled displacement of the hydraulic cylinder 15 and of the seat column 20. Indeed, when the floating piston 105a reaches one of its extreme positions, the piston 15a of the hydraulic cylinder 15 is also stopped in a corresponding locked, upper, respectively lower, position. The choice of the volumes of the upper 105.1 and lower 105.2 hydraulic chambers, and the stroke of the floating piston 105a allows the effective amplitude A of the controlled displacement of the hydraulic cylinder 15, and thus of the seat column 20, to be adjusted.

In FIG. 3, it can also be seen that the hydraulic device 100 furthermore comprises a balancing chamber 110, which is connected to the accumulator 125 so as to subject the floating piston 105a to the same hydraulic pressure as that of the accumulator 125.

Moreover, the hydraulic device further comprises a compression spring 112 exerting a return force on the floating piston 105a. In the embodiment variant illustrated in FIG. 3, the compression spring 112 is arranged so as to return the floating piston 105a to the lower position during the embarkation phase, i.e. when the electrovalves 121, 122 are activated (open). In this lower position, the floating piston 105a is thus in abutment at one end of the floating cylinder 105, the lower hydraulic chamber 105.2 being empty and the upper hydraulic chamber 105.1 full. This starting condition means that movement of the seat column 20, starting from the locking point, with the electrovalves 121, 122 deactivated, can only happen in the downward direction (as illustrated in FIG. 1A), with a limitation in the lower position fixed by the floating piston 105a reaching the end of stroke, upper hydraulic chamber 105.1 empty and lower hydraulic chamber 105.2 full, and a return to the upper position, identical to the starting position, upper hydraulic chamber 105.1 full and lower hydraulic chamber 105.2 empty.

However, other configurations can be considered by modifying the starting position of the floating piston 105a, for example by keeping the floating piston 105a in an intermediate position between the two extreme positions. To this end, the hydraulic device 100 could for example comprise two compression springs operating in opposition, on either side of the floating piston 105a, and arranged so as to return the floating piston 105a to an intermediate position between the upper and lower positions of the floating piston 105a. In this context, it is obviously possible to start from a position offset from the centre using springs of different lengths or characteristics in order to obtain asymmetrical downward or upward displacement values.

It is also possible to obtain a progressive suspension or damping effect by mounting biasing springs on the floating piston 105a having "stiffer" characteristics so that the floating piston 105a is progressively braked in its travel by the increase of forces of the biasing spring(s). The resulting system thus prevents the floating piston 105a from arriving at a dead stop, thus greatly limiting the risk of impact.

Instead of compression springs, it is obviously possible to use any other suitable biasing elements, such as elastomer springs or pneumatic springs.

FIG. 3 further shows, preferentially, the presence of a flow regulator 115 placed on the path of the hydraulic fluid between the hydraulic cylinder 15 and the floating cylinder 105, and more specifically in the conduit connecting the lower hydraulic chamber 15.2 of the hydraulic cylinder 15 to the lower hydraulic chamber 105.2 of the floating cylinder 105. This flow regulator 115 advantageously makes it possible to regulate the speed of displacement of the piston 15a of the hydraulic cylinder 15. This speed limitation is only effective when the electrovalves 121, 122 are closed (deactivated), and in no way affects the speed of displacement of the system during the embarkation phase, when movement of the seat column 20 has to be easy.

Figure 4:
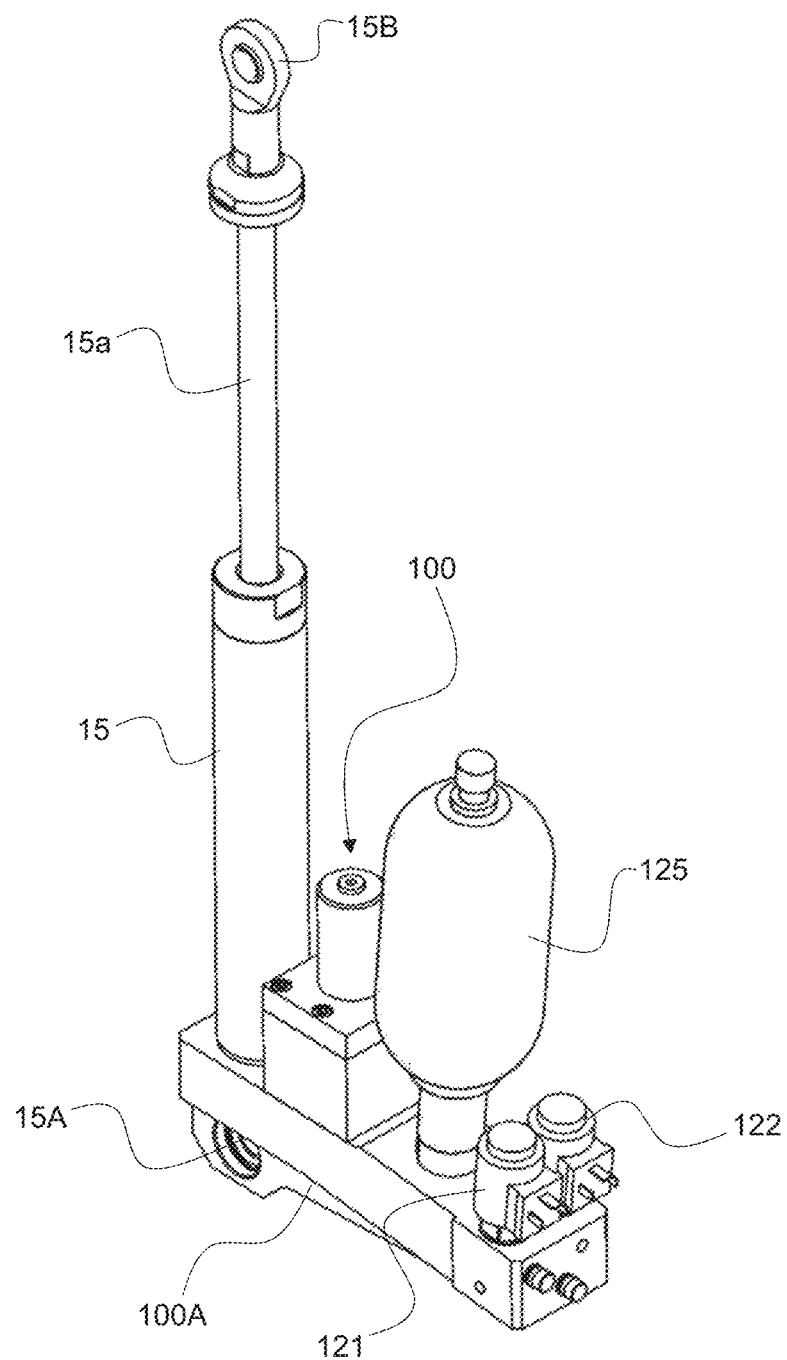
FIG. 4 is a perspective rear view of the hydraulic system equipping the passenger restraint system of FIG. 1.

FIG. 4 shows a perspective rear view of the hydraulic system equipping the passenger restraint system 1 of FIG. 1, including the hydraulic cylinder 15, the hydraulic device 100, the accumulator 125 and the two electrovalves 121, 122. As illustrated, these various elements are advantageously mounted on one and the same support element 100A, which in turn is arranged to be mounted inside an accommodating space 10A provided in the fixed column 10 (see FIG. 2). This support element 100A is mounted within the accommodating space 10A so as to allow a pivoting movement about the axis coinciding with the lower articulated end 15A of the hydraulic cylinder 15.

Figure 4A:
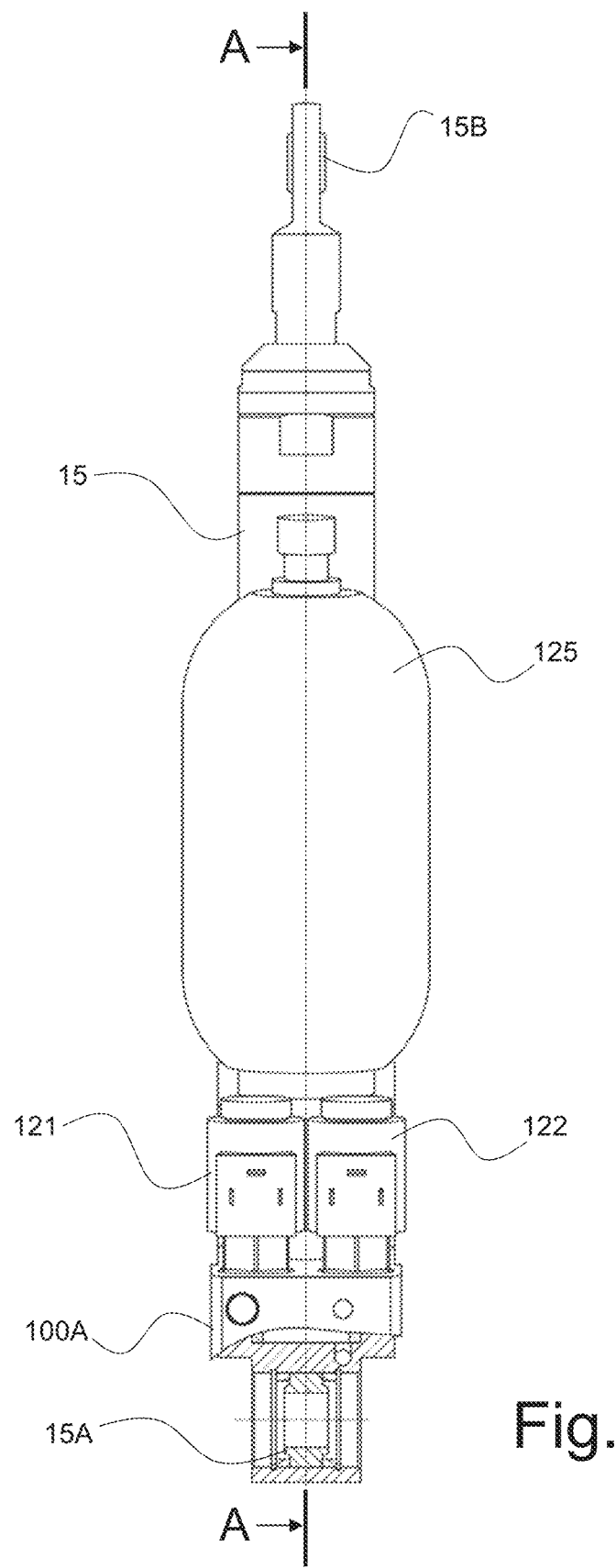
FIG. 4A is a rear view of the hydraulic system of FIG. 4.

FIGS. 4A and 4B are respectively a rear view and a cross-sectional view (along a sectional plane A-A shown in FIG. 4A) of the hydraulic system of FIG. 4. In particular, the cross-sectional view makes it possible to identify the floating cylinder 105 with its floating piston 105a positioned in the lower position, hydraulic chamber 105.2 empty, the balancing chamber 110 placed above the floating piston 105a and communicating with the accumulator 125, and the compression spring 112 arranged to return the floating piston 105a to the lower position. All of the hydraulic circuit is not visible in FIG. 4B, but it will be understood that the arrangement and interconnection of the elements of the hydraulic system represented is identical to the hydraulic diagram of FIG. 3.

The Figures illustrate the relative simplicity as well as the compactness of the hydraulic system necessary for the balancing and the "floating" locking of the seat column 20.

It will generally be understood that various modifications and/or improvements that are obvious to a person skilled in the art can be made to the embodiments described in the present description without going beyond the scope of the invention as defined by the appended claims. In particular, the articulated linkage and the floating locking are two distinct functions that can be applied separately from each other, or, very advantageously, in combination.

Moreover, although the Figures show an embodiment where a dedicated accumulator is associated with the restraint system, other solutions can be considered. For example, in one variant, a centralized accumulator, of greater capacity, could be coupled to a plurality of restraint systems, in particular to each restraint system of one and the same row of passengers or of one and the same vehicle. In such case, it will therefore be understood that the accumulator will no longer necessarily be disposed on and integrated within each restraint system, but will be disposed in the vicinity of the row of passengers in question or on the vehicle in question, and that all of the hydraulic systems of the various restraint systems will then be coupled to one and the same centralized accumulator.

LIST OF REFERENCE SIGNS USED IN THE PRESENT DESCRIPTION AND IN THE DRAWINGS 1 passenger restraint system according to one embodiment of the invention
P passenger in an essentially upright posture
A amplitude of the controlled displacement of the hydraulic cylinder 15/of the seat column 20
10 fixed column
10A accommodating space provided in the fixed column 10, configured to receive in particular the hydraulic device 100 and the lower end 15A of the hydraulic cylinder
15 hydraulic cylinder
15a piston of the hydraulic cylinder
15A lower end of the hydraulic cylinder 15, articulated to the fixed column 10
15B upper end of the hydraulic cylinder 15 (upper end of the piston 15a), articulated to the seat column 20
15.1 upper hydraulic chamber of the hydraulic cylinder 15
15.2 lower hydraulic chamber of the hydraulic cylinder 15
20 seat column, vertically movable relative to the fixed column 10 in order to adjust the seat column to the size of the passenger P
30 articulated linkage between the fixed column 10 and the seat column 20/parallelogram linkage
30A intermediate space of the articulated linkage 30 through which the hydraulic cylinder 15 extends
31 pair of lower levers of the articulated linkage 30
32 pair of upper levers of the articulated linkage 30
100 hydraulic device coupled to the hydraulic cylinder 15
100A support element of the hydraulic device 100 mounted in the accommodating space 10A of the fixed column 10
105 floating cylinder
105a piston of the floating cylinder 105
105.1 upper hydraulic chamber of the floating cylinder 105
105.2 lower hydraulic chamber of the floating cylinder 105
110 balancing chamber of the floating piston 105a coupled to the accumulator 125
112 biasing element (for example compression spring) for returning the floating piston 105a
115 flow regulator
121 (first) electrovalve coupled between the accumulator 125 and the upper hydraulic chamber 15.1 of the hydraulic cylinder 15
122 (second) electrovalve coupled between the accumulator 125 and the upper hydraulic chamber 15.2 of the hydraulic cylinder 15
125 accumulator for balancing the weight of the seat column 20 (in particular hydropneumatic accumulator)
200 holding device for the passenger P, secured to the seat column 20
201 backrest
201A headrest
202 lateral holding elements
203 front safety bar mounted pivotably on the seat column 20
204 abdominal holding element mounted at the distal end of the front safety bar 203
205 saddle
206 harness

The invention claimed is:

1. A passenger restraint system for roller coasters, designed to maintain a passenger in an essentially upright posture, the passenger restraint system comprising a fixed column and a seat column designed to support and hold the passenger, which seat column is coupled to the fixed column so as to be movable relative to the fixed column and to be adjustable to a size of the passenger during an embarkation phase,
wherein the seat column is coupled to the fixed column by means of an articulated linkage, and wherein the passenger restraint system further comprises a device for balancing the seat column, which balancing device comprises a cylinder fixed, at a first articulated end, to the fixed column and, at a second articulated end, to the seat column,
and wherein the cylinder is a hydraulic cylinder that also provides selective locking of the seat column at a locking point.

2. The passenger restraint system according to claim 1, wherein the articulated linkage comprises a set of levers articulated on the fixed column and on the seat column and forming a parallelogram linkage between the fixed column and the seat column.

3. The passenger restraint system according to claim 1, wherein the cylinder extends through an intermediate space of the articulated linkage.

4. The passenger restraint system according to claim 1, further comprising a hydraulic device coupled to the hydraulic cylinder and configured to provide controlled displacement of the hydraulic cylinder, and thus of the seat column, relative to the locking point.

5. The passenger restraint system according to claim 4, further comprising means configured to damp the controlled displacement of the hydraulic cylinder.

6. The passenger restraint system according to claim 1, further comprising an accumulator coupled to the hydraulic cylinder and capable of generating a hydraulic pressure necessary for balancing a weight of the seat column.

7. The passenger restraint system according to claim 6, wherein the accumulator is a hydropneumatic accumulator.

8. The passenger restraint system according to claim 6, wherein the accumulator is coupled to upper and lower hydraulic chambers of the hydraulic cylinder, the accumulator being coupled to the upper hydraulic chamber of the hydraulic cylinder via a first electrovalve and to the lower hydraulic chamber of the hydraulic cylinder via a second electrovalve,
wherein the first and second electrovalves can be activated, during the embarkation phase of the passenger, in order to allow the passage of hydraulic fluid from the lower hydraulic chamber to the upper hydraulic chamber of the hydraulic cylinder, and vice versa, thus placing the hydraulic cylinder in an unlocked configuration allowing the adjustment of the seat column to the size of the passenger,
and wherein the first and second electrovalves can be deactivated in order to prevent the passage of hydraulic fluid from the lower hydraulic chamber to the upper hydraulic chamber of the hydraulic cylinder, and vice versa, thus placing the hydraulic cylinder in a locked configuration.

9. The passenger restraint system according to claim 8, wherein the first and second electrovalves are each provided with a non-return valve allowing the hydraulic fluid to circulate from the accumulator to the upper hydraulic chamber or the lower hydraulic chamber of the hydraulic cylinder when the first and second electrovalves are deactivated.

10. The passenger restraint system according to claim 8, further comprising a hydraulic device coupled to the hydraulic cylinder and configured to provide controlled displacement of the hydraulic cylinder, and thus of the seat column, relative to the locking point,
wherein the hydraulic device comprises a floating cylinder comprising a floating piston and upper and lower hydraulic chambers disposed on either side of the floating piston, which chambers are connected to the upper and lower hydraulic chambers of the hydraulic cylinder so as to allow, when the hydraulic cylinder is in the locked configuration, the passage of the hydraulic fluid from the hydraulic cylinder to the floating cylinder, and vice versa, the floating piston having an amplitude of movement and a capacity determining the amplitude of the controlled displacement of the hydraulic cylinder and of the seat column.

11. The passenger restraint system according to claim 10, wherein the hydraulic device further comprises a balancing chamber subjecting the floating piston to the same hydraulic pressure as that of the accumulator.

12. The passenger restraint system according to claim 10, wherein the hydraulic device further comprises at least one biasing element exerting a return force on the floating piston.

13. The passenger restraint system according to claim 12, wherein the at least one biasing element is a compression spring, an elastomer spring or a pneumatic spring.

14. The passenger restraint system according to claim 12, wherein the hydraulic device comprises a single biasing element arranged so as to return the floating piston to a lower position during the embarkation phase,
or wherein the hydraulic device comprises two biasing elements operating in opposition and arranged in such a way as to return the floating piston to an intermediate position between upper and lower positions during the embarkation phase.

15. The passenger restraint system according to claim 10, further comprising a flow regulator placed on the path of the hydraulic fluid between the hydraulic cylinder and the floating cylinder.

16. The passenger restraint system according to claim 15, wherein the flow regulator is placed in a conduit connecting the lower hydraulic chamber of the hydraulic cylinder to the lower hydraulic chamber of the floating cylinder.

17. A roller coaster comprising at least one passenger restraint system according to claim 1.

18. A passenger restraint system for roller coasters, designed to maintain a passenger in an essentially upright posture, the passenger restraint system comprising a fixed column and a seat column designed to support and hold the passenger, which seat column is coupled to the fixed column so as to be movable relative to the fixed column and to be adjustable to a size of the passenger during an embarkation phase,
the passenger restraint system further comprising:
a hydraulic cylinder for balancing the seat column and for selectively locking the seat column at a locking point, which hydraulic cylinder is fixed, at a first end, to the fixed column and, at a second end, to the seat column; and
a hydraulic device coupled to the hydraulic cylinder and configured to provide controlled displacement of the hydraulic cylinder, and thus of the seat column, relative to the locking point.

19. The passenger restraint system according to claim 18, further comprising an accumulator coupled to the hydraulic cylinder and capable of generating a hydraulic pressure necessary for balancing a weight of the seat column.

20. The passenger restraint system according to claim 19, wherein the accumulator is a hydropneumatic accumulator.

21. The passenger restraint system according to claim 19, wherein the accumulator is coupled to upper and lower hydraulic chambers of the hydraulic cylinder, the accumulator being coupled to the upper hydraulic chamber of the hydraulic cylinder via a first electrovalve and to the lower hydraulic chamber of the hydraulic cylinder via a second electrovalve,
wherein the first and second electrovalves can be activated, during the embarkation phase of the passenger, in order to allow the passage of hydraulic fluid from the lower hydraulic chamber to the upper hydraulic chamber of the hydraulic cylinder, and vice versa, thus placing the hydraulic cylinder in an unlocked configuration allowing the adjustment of the seat column to the size of the passenger,
and wherein the first and second electrovalves can be deactivated in order to prevent the passage of hydraulic fluid from the lower hydraulic chamber to the upper hydraulic chamber of the hydraulic cylinder, and vice versa, thus placing the hydraulic cylinder in a locked configuration.

22. The passenger restraint system according to claim 21, wherein the first and second electrovalves are each provided with a non-return valve allowing the hydraulic fluid to circulate from the accumulator to the upper hydraulic chamber or the lower hydraulic chamber of the hydraulic cylinder when the first and second electrovalves are deactivated.

23. The passenger restraint system according to claim 21, wherein the hydraulic device comprises a floating cylinder comprising a floating piston and upper and lower hydraulic chambers disposed on either side of the floating piston, which chambers are connected to the upper and lower hydraulic chambers of the hydraulic cylinder so as to allow, when the hydraulic cylinder is in the locked configuration, the passage of the hydraulic fluid from the hydraulic cylinder to the floating cylinder, and vice versa, the floating piston having an amplitude of movement and a capacity determining the amplitude the controlled displacement of the hydraulic cylinder and of the seat column.

24. The passenger restraint system according to claim 23, wherein the hydraulic device further comprises a balancing chamber subjecting the floating piston to the same hydraulic pressure as that of the accumulator.

25. The passenger restraint system according to claim 23, wherein the hydraulic device further comprises at least one biasing element exerting a return force on the floating piston.

26. The passenger restraint system according to claim 25, wherein the at least one biasing element is a compression spring, an elastomer spring or a pneumatic spring.

27. The passenger restraint system according to claim 25, wherein the hydraulic device comprises a single biasing element arranged so as to return the floating piston to a lower position during the embarkation phase, or wherein the hydraulic device comprises two biasing elements operating in opposition and arranged in such a way as to return the floating piston to an intermediate position between upper and lower positions during the embarkation phase.

28. The passenger restraint system according to claim 23, further comprising a flow regulator placed on the path of the hydraulic fluid between the hydraulic cylinder and the floating cylinder.

29. The passenger restraint system according to claim 28, wherein the flow regulator is placed in a conduit connecting the lower hydraulic chamber of the hydraulic cylinder to the lower hydraulic chamber of the floating cylinder.

30. The passenger restraint system according to claim 18, further comprising means configured to damp the controlled displacement of the hydraulic cylinder.

31. A roller coaster comprising at least one passenger restraint system according to claim 18.

* * * * *